United States Patent

Rich et al.

[11] 3,906,984
[45] Sept. 23, 1975

[54] POLYMERIZATION APPARATUS
[75] Inventors: John Theodore Rich; John Percival Russell, both of Pontypool, England
[73] Assignee: Imperial Chemical Industries Limited, London, England
[22] Filed: June 25, 1973
[21] Appl. No.: 372,935

Related U.S. Application Data
[62] Division of Ser. No. 799,709, Feb. 17, 1969, abandoned.

[52] U.S. Cl. ............................. 137/171; 137/592
[51] Int. Cl.² ................................ B01D 57/00
[58] Field of Search............ 55/396, 448; 98/115 R; 137/171, 590, 592; 239/120–122

[56]          References Cited
        UNITED STATES PATENTS
3,044,993   7/1962   Tiemersma ......................... 260/78
3,223,243  12/1965   Muller ........................... 137/592 X
        FOREIGN PATENTS OR APPLICATIONS
485,765    5/1938   United Kingdom ............... 98/115 R

| 18,369 | 11/1908 | Norway | 55/396 |
| 18,449 | 12/1908 | Norway | 55/396 |
| 188,323 | 1/1957 | Austria | 55/396 |

*Primary Examiner*—Alan Cohan
*Assistant Examiner*—Gerald A. Michalsky
*Attorney, Agent, or Firm*—Cushman, Darby & Cushman

[57] ABSTRACT

Continuous polymerization apparatus including a vessel containing a melt pool of polymer and an open-ended conduit and a separator for streams of molten polymer associated with steam flows into the pool while steam passes through the center of the conduit. The open end of the conduit is shaped and located so that steam is separated from the molten polymer and can be withdrawn while freefall of the molten polymer into the pool is substantially prevented.

5 Claims, 5 Drawing Figures

Inventors
JOHN THEODORE RICH
JOHN PERCIVAL RUSSELL
By Cushman, Darby & Cushman
Attorneys

POLYMERIZATION APPARATUS

This is a division, of application Ser. No. 799,709, filed Feb. 17, 1969, now abandoned.

The present invention relates to new and improved apparatus for use in the continuous manufacture of high molecular weight polymers, and particularly fibre forming polymers. More particularly it relates to a separator for piped streams of molten fibre-forming polyamide associated with steam.

Although the embodiments are described with reference to polyamides and steam, they could, of course, be employed for piped streams of other liquids and gases or vapours having similar physical properties to those of molten polyamides and steam and behaving in a similar manner. For instance the gas or vapour could comprise nitrogen.

In the manufacture of polyamides by a continuous process using a pipe it not infrequently happens that the high molecular weight polyamide is obtained in molten form associated with steam, and it is necessary to separate the latter from the polyamide as they issue from the pipe. The steam may have arisen from moisture originally contained in the monomer starting materials, or it may have been chemically evolved in the polymerisation reaction, or it could have been introduced as a non-oxidising gaseous medium. It is to be understood that the steam commonly emerges from the pipe at high velocity. It is possible to conduct the polyamide and steam into a heated vented vessel, such as the melting chamber of melt-spinning apparatus, in the bottom of which the molten polyamide collects, to be removed as required, whilst the steam escapes by a vent. In practice, however, owing to the velocity with which the steam issues from the open end of the pipe, some of the polyamide is inevitably spattered on to the walls of the vessel, which becomes covered with a film thereof. Although it would be expected that this polyamide film, being above its melting point, would constantly run down into the polyamide pool below, parts of it at least accumulate for a sufficient time to produce an undesirable degree of degradation in the polyamide.

Various devices in the form of modified ends to the pipe have been proposed without affording a satisfactory solution to the problem of resolving the outflow into steam on the one hand and a quietly flowing stream of polyamide on the other.

The present invention is based on the fact that the polyamide and steam move through the pipe in what is known as two-phase annular flow, by which is meant that the rather viscous molten polyamide flows along the inner surface of the pipe, constituting a cross-sectional annulus, while the steam passes down the centre, at a much greater linear velocity than the polyamide. It has been found possible to separate the molten polyamide from the steam in said pipe by providing an orifice at the end thereof, located, for instance, above the melt-pool of melt-spinning apparatus, of such form that the polyamide flows along the wall and out of the pipe and falls into said melt-pool while the steam proceeds out of the middle of said orifice and then turns upwards and is removed through a suitable exit. The pipe is usually expanded, starting some distance before its end, in order to reduce the velocity of the steam as it approaches the pipe outlet. For instance, such a device may comprise a vertical pipe ending in a vertical cone located above the melt pool. The polymer flows down the inner wall of the cone and drips off at the open, large end of the cone into the melt-pool while the steam, with reduced velocity, leaves the wide, open, bottom end of the cone and flows back upwards, away from the melt-pool and out through a suitable vent.

Applicants have now found that the polymer tends to form stalactites hanging from the pipe or cone end, which stalactites become thermally degraded. Pieces of such degraded material may fall into the melt-pool and give rise to catalytic gelling of the polymer and to, for instance, extruded filaments of poor quality. Catalytic gelation may also be started by new polymer flowing over such degraded polymer stalactites. The same disadvantage is, of course, operative whatever the shape of the articles made from the polymer in the melt-pool.

Accordingly the present invention in one aspect provides a separator for molten polymer flowing, in association with steam or other gas or vapour, in a conduit in continuous polymerisation apparatus, which separator comprises an expanding outlet for said conduit, said outlet being of such shape and provided with such channelling or other means as to make possible the substantial prevention of free-fall of polymer through gas between said outlet and a pool of molten polymer.

In another aspect the present invention provides a process whereby molten polymer, flowing in association with steam or other gas or vapour in a conduit in continuous polymerisation apparatus, is passed through a separator comprising an expanded outlet for said conduit, said outlet being of such shape and provided with such channelling or other means and located in such a manner with respect to the surface of a pool of molten polymer that free-fall of polymer through gas between said outlet and said pool is substantially prevented.

The separator, made of any suitable material, may be maintained at a temperature above the melting point of the polymer, for instance Nylon 66, by conventional means, e.g. jackets heated electrically or by a vapour of diphenyl and diphenyl oxide.

There will now be described, by way of example, convenient embodiments of the invention, this description referring to the following drawings.

Figure 1:
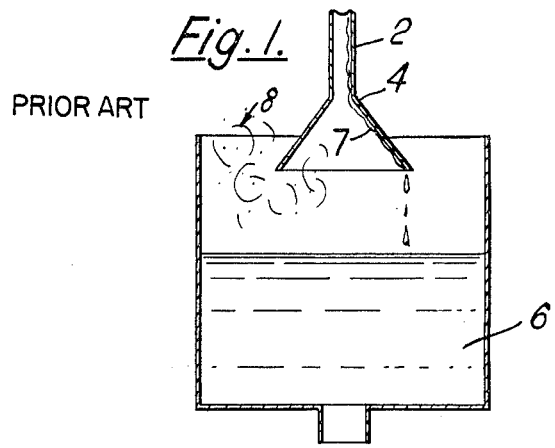
FIG. 1 is a diagrammatic cross-section of a prior art separator comprising a simple conical outlet, above a melt-pool.
Figure 2:
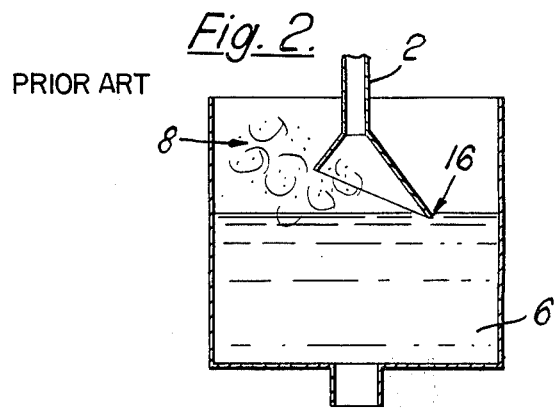
FIG. 2 is a diagrammatic cross-section of a prior art separator comprising a cut-away conical outlet.

In order to avoid stalactite formtion, free-fall of polymer from the end of the pipe outlet into the melt-pool must be avoided. If the cone 4 of the end of pipe 2, as illustrated in FIG. 1, is simply lowered so that its bottom edge touches the melt-pool, 6, there is then no free outlet from the steam, 8. This difficulty can be overcome to some extent by cutting away part of the cone, as shown in FIG. 2. However, it has been found in practice that the high-viscosity polymer, 7, will not run down the bottom cone edge to point 16, which is immersed in the melt-pool, but still tends to drip from said edge in free-fall.

Figure 3:
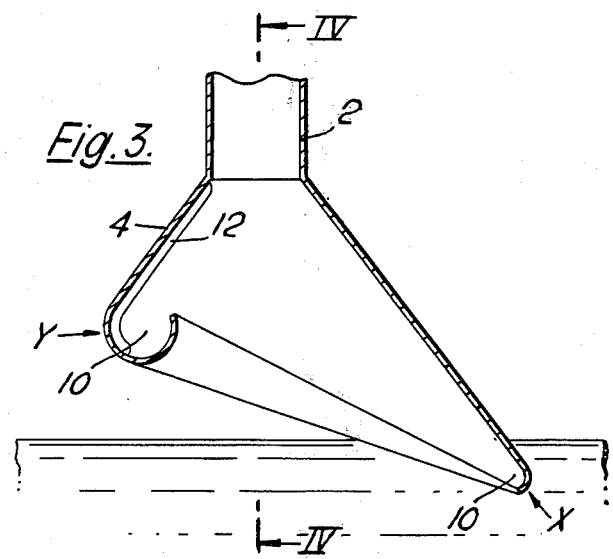
FIG. 3 is a diagrammatic cross-section of the lower edge of the conical part of a separator according to the present invention.

This difficulty can be overcome by having a downwardly sloping bottom edge of the conical structure which edge is curved upwardly to form a channel, 10, as shown in FIG. 3.

Figure 4:
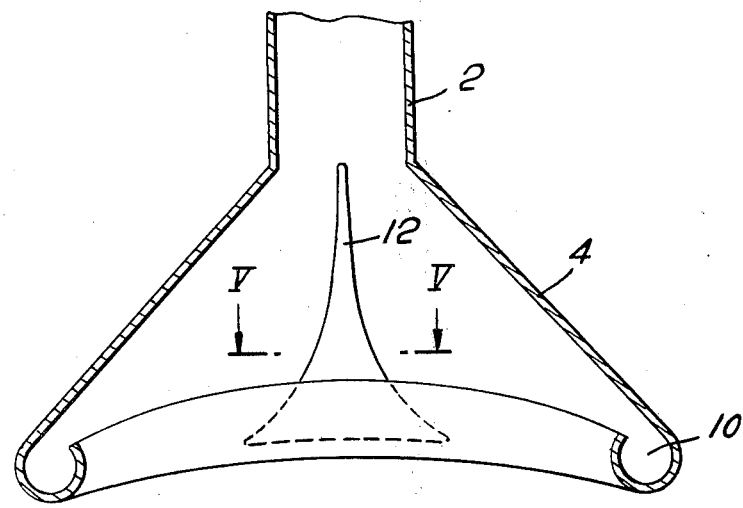
FIG. 4 is a view of a cross-section taken along the line iv — iv of FIG. 3.
Figure 5:
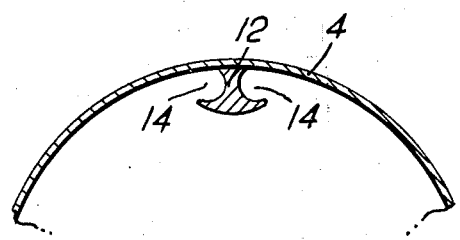
FIG. 5 is a cross-section taken along the line v — v of FIG. 4.

The channel is made of suitable size and dimensions to match the polymer output such that the polymer will flow down along it and into the melt-pool without the aforesaid undesirable free-fall. The channel decreases both in width and depth from a maximum at the point Y (see FIG. 3), where the lower edge of the conical structure is nearest to the apex, since the polymer tends to build up at this point. Preferably, though not essentially, this build-up can be further obviated by providing the inside of the conical structure with a rib, 12, projecting inwardly and of width increasing towards the base at point Y, as shown in FIG. 4. It has been found advantageous to make the cross-section of said rib somewhat of the form shown in FIG. 5, that is, provided with two channels, 14, down which molten polymer may flow, in order to prevent free-fall from the rib itself.

It will be clear to one skilled in the art that various modifications, in shape and size etc. of the separator of the present invention may be made so long as the object of the present invention, namely the prevention of free-fall of polymer through gas into the molten polymer pool, is accomplished.

What we claim is:

1. In a continuous polymerization apparatus for producing a flow of molten polymer and steam associated therewith and for separating the steam from the molten polymer, said apparatus including a vessel containing a melt pool of polymer and an open-ended conduit through which the molten polymer flows in a path along the wall and out of the conduit into the pool while the steam passes through the center of the conduit, the improvement comprising a downwardly facing expanding outlet device at the open end of said conduit and between said open end and the surface of said pool, the bottom edge of said expanding outlet device being downwardly sloping from a highest point to a lowest point and being curved inwardly and upwardly to form a channel which has an outlet at said lowest point, the dimensions and shape of said outlet device being chosen such that the polymer can flow via the channel into the pool while the steam can escape upwardly with freefall of the molten polymer through the gaseous fluid being substantially prevented.

2. An apparatus as claimed in claim 1, wherein the channel decreases both in width and depth in the direction of the lowest point of the bottom edge.

3. An apparatus as claimed in claim 1, wherein at least one rib is provided on the inside of the outlet device, said rib projecting inwardly and being of width increasing toward the highest point of the bottom edge.

4. An apparatus as claimed in claim 1, wherein the outlet device is in the form of a cone.

5. Apparatus as in claim 1 wherein said lowest point of said expanding outlet device and said outlet of said channel touches said melt-pool.

* * * * *

UNITED STATES PATENT OFFICE
CERTIFICATE OF CORRECTION

PATENT NO. : 3,906,984
DATED : September 23, 1975
INVENTOR(S) : John Theodore Rich and John Percival Russell It is certified that error appears in the above-identified patent and that said Letters Patent are hereby corrected as shown below:

On the front page format, after paragraph [21] insert:

--[30] Foreign Application Priority Data
    March 11, 1968  Great Britain.........11768/68--

*Signed and Sealed this*

*ninth* Day of *March 1976*

[SEAL]

Attest:

RUTH C. MASON
*Attesting Officer*

C. MARSHALL DANN
*Commissioner of Patents and Trademarks*